(12) United States Patent
Zhou et al.

(10) Patent No.: US 11,568,637 B2
(45) Date of Patent: Jan. 31, 2023

(54) UAV VIDEO AESTHETIC QUALITY EVALUATION METHOD BASED ON MULTI-MODAL DEEP LEARNING

(71) Applicant: Beihang University, Beijing (CN)

(72) Inventors: Bin Zhou, Beijing (CN); Qi Kuang, Beijing (CN); Qinpin Zhao, Beijing (CN)

(73) Assignee: Beihang University, Beijing (CN)

( * ) Notice: Subject to any disclaimer, the term of this patent is extended or adjusted under 35 U.S.C. 154(b) by 346 days.

(21) Appl. No.: 16/997,825

(22) Filed: Aug. 19, 2020

(65) Prior Publication Data

US 2021/0158008 A1 May 27, 2021

(30) Foreign Application Priority Data

Nov. 21, 2019 (CN) .......................... 201911146496.2

(51) Int. Cl.
*G06V 20/13* (2022.01)
*B64C 39/02* (2006.01)
*G06K 9/62* (2022.01)
*G06N 3/08* (2006.01)
(Continued)

(52) U.S. Cl.
CPC ............ *G06V 20/13* (2022.01); *B64C 39/024* (2013.01); *G06K 9/6268* (2013.01); *G06N 3/08* (2013.01); *G06T 9/002* (2013.01); *G08G 5/003* (2013.01); *B64C 2201/127* (2013.01)

(58) Field of Classification Search
CPC ............... G06V 20/13; B64C 39/024; B64C 2201/127; G06K 9/6268; G06N 3/08; G06T 9/002; G08G 5/003
See application file for complete search history.

(56) References Cited

U.S. PATENT DOCUMENTS 8,706,675 B1 * 4/2014 Samaniego ............ G06N 5/022
706/52
2020/0160616 A1 * 5/2020 Li ........................ G06N 3/0454

OTHER PUBLICATIONS

Jalil, Bushra, et al. "Fault detection in power equipment via an unmanned aerial system using multi modal data." Sensors 19.13 (2019): 3014. (Year: 2019).*

(Continued)

*Primary Examiner* — Fayyaz Alam
(74) *Attorney, Agent, or Firm* — Dragon Sun Law Firm, PC; Jinggao Li, Esq.; Nathaniel Perkins

(57) ABSTRACT

The present disclosure provides a UAV video aesthetic quality evaluation method based on multi-modal deep learning, which establishes a UAV video aesthetic evaluation data set, analyzes the UAV video through a multi-modal neural network, extracts high-dimensional features, and concatenates the extracted features, thereby achieving aesthetic quality evaluation of the UAV video. There are four steps, step one to: establish a UAV video aesthetic evaluation data set, which is divided into positive samples and negative samples according to the video shooting quality; step two to: use SLAM technology to restore the UAV's flight trajectory and to reconstruct a sparse 3D structure of the scene; step three to: through a multi-modal neural network, extract features of the input UAV video on the image branch, motion branch, and structure branch respectively; and step four to: concatenate the features on multiple branches to obtain the final video aesthetic label and video scene type.

5 Claims, 3 Drawing Sheets

(51) Int. Cl.
    *G06T 9/00*         (2006.01)
    *G08G 5/00*         (2006.01)

(56)             References Cited

OTHER PUBLICATIONS

Siewert, Sam, et al. "Drone net architecture for UAS traffic management multi-modal sensor networking experiments." 2018 IEEE Aerospace Conference. IEEE, 2018. (Year: 2018).*

Kuang, Qi, et al. "Deep multimodality learning for UAV video aesthetic quality assessment." IEEE Transactions on Multimedia 22.10 (2019): 2623-2634. (Year: 2019).*

\* cited by examiner

UAV VIDEO AESTHETIC QUALITY EVALUATION METHOD BASED ON MULTI-MODAL DEEP LEARNING

CROSS-REFERENCE TO RELATED PATENT APPLICATION

This application claims priority to and the benefit of CN 2019111464962, filed Nov. 21, 2019, entitled "UAV Video Aesthetic Quality Evaluation Method Based On Multi-Modal Deep Learning," by Bin ZHOU et al. The entire disclosure of the above-identified application is incorporated herein by reference.

TECHNICAL FIELD

The present disclosure relates to an Unmanned Aerial Vehicle (UAV) video aesthetic quality evaluation method based on multi-modal deep learning, which establishes a UAV video aesthetic evaluation data set, analyzes the UAV video through a multi-modal neural network, extracts high-dimensional features, and then concatenates the extracted features, thereby achieving evaluation of the UAV video aesthetic quality, with certain effectiveness and universality. It belongs to the field of computer vision.

BACKGROUND

With the rapid popularization of cameras and smartphones, visual content perception and understanding have become the research direction of such fields as computer vision and computer photography. Image and video aesthetic quality evaluation is a branch in the direction of visual content perception and understanding. Image and video aesthetic quality evaluation aims to use computers to simulate human perception and cognition of beauty, and automatically evaluate the beauty of images and videos. In recent years, some researchers have conducted a research on related technologies. People analyze images in terms of composition, color, light and shadow, depth of field, etc. For videos, in addition to considering the aesthetic factors of each frame of image, further studies are conducted on video-related characteristics such as camera motion and picture continuity.

In 2004, Microsoft Research Asia and the Department of Automation of Tsinghua University jointly proposed a technique that can automatically distinguish photos taken by professional photographers and amateur users. Thereafter, most aesthetic quality evaluations lie in that by designing various aesthetic features, the results of human evaluation of aesthetic quality are fit to automatically classify and numerically evaluate images and videos.

However, these studies did not consider that different contents have different aesthetic features, thus having a significant influence on the effect of classification and scoring. Since 2014, image aesthetic classification and scoring have entered the era of deep learning. Researchers have used convolutional neural networks to conduct aesthetic classification and scoring of images, and the accuracy of their classification has been greatly improved compared with manually designed features. As for video aesthetic classification and scoring, because there are fewer data sets, related work has not involved much deep learning yet.

However, these methods are all aimed at traditional videos and images. For videos like aerial photography, relevant features are not fully utilized. UAVs are now used in various fields, and one very important application is photography. With the development and popularization of consumer-grade UAVs, aerial photography no longer requires professional and expensive equipment as before. However, aerial photography still requires the operator to have certain professional knowledge and experience, so it is still not easy for amateurs to shoot high-quality aerial photography works. In order to make the UAVs more intelligent and the aerial photography works more beautiful, the aesthetic quality evaluation of UAV video has also become one of the hotspots of people's attention. It can be applied to the UAV intelligent shooting, automatic rating of aerial video websites, aerial video automatic editing and other aspects.

In 2016, Liang Ziqiang of China Cable TV Network Co., Ltd. published an article about the video creativity and aesthetic exploration of UAV aerial photography and documentary on TV Research, discussing the innovation brought by the application of UAV aerial photography to documentary creation. In 2017, Xiong Xiaoliang of Peking University and others proposed a patent for a UAV videography method and system based on aesthetic evaluation, which calculates the aesthetic score of UAV photographed images based on an aesthetic evaluation algorithm. This method only grades the image aesthetically, and cannot evaluate the aesthetic quality of the video taken by the UAV.

Therefore, a heretofore unaddressed need exists in the art to address the aforementioned deficiencies and inadequacies.

SUMMARY

The technology of the present disclosure solves the problem: to provide a UAV video aesthetic quality evaluation method based on multi-modal deep learning, which analyzes the UAV video through a multi-modal neural network and extracts high-dimensional features, and then concatenates the extracted features, thereby realizing an abstract expression of the UAV video aesthetic quality. In the end, the purpose of performing aesthetic quality evaluation of the UAV video is achieved.

The technical solution adopted by the present disclosure is a UAV video aesthetic quality evaluation method based on multi-modal deep learning, including the following actions or steps to:

(1) Count the UAV video sources, shooting locations, shooting methods, scene types, to establish a UAV video aesthetic evaluation data set, and divide the data set into positive samples and negative samples according to network scores and shooting quality; wherein positive samples are professional UAV videos from aerial documentaries or movie clips shot by professionals with a network score higher than 8.0 (out of 10.0), while negative samples are amateur UAV videos from videos taken by amateurs using consumer-grade UAVs;

(2) For a UAV video in the UAV video aesthetic evaluation data set, use the SLAM technology based on the correlation between the frames in the UAV video to restore the pose of the camera, that is, the UAV's flight trajectory and the orientation of the shooting lens, and to reconstruct a sparse 3D structure of the scene, wherein both the pose of the camera and the structure of the scene are normalized;

(3) Input the UAV video into a multi-modal neural network, the multi-modal neural network structure mainly divided into three branches: image branch, motion branch and structure branch. The input of the image branch is the original frame of the video, while the inputs of the motion branch and the structure branch are respectively the UAV's flight trajectory and the orientation of the shooting lens in step (2) as well as the sparse 3D structure of the scene. Through multi-modal deep learning, the video frame image aesthetic features, camera motion features, and shooting scene structure features are respectively extracted on three branches;

(4) Concatenate the video frame image aesthetic features, camera motion features, and shooting scene structure features extracted in step (3) as the video's aesthetic features, and by adding sub-tasks of video scene type classification, classify the video scene type as mountains, rivers, plains or buildings, to improve the generalization ability and learning effect of the multi-modal neural network model, and to finally obtain a UAV video aesthetic label as the result of the UAV video aesthetic quality evaluation, that is, the video is a professional UAV video or is an amateur UAV video and the video scene type. The step (1) is specifically implemented as the following actions to:

(1.1) Establish a UAV video aesthetic evaluation data set, each segment of video in the data set is a complete segment of shot without irrelevant noises of watermarks, logos, and borders;

(1.2) Count whether each video comes from a video website or a documentary, where the video was taken, and how the UAV video was filmed, that is, rotation shooting, forward shooting, side flight shooting or backward shooting, as well as whether the scene type of the video is mountains, rivers, plains or buildings;

(1.3) Based on the shooting quality, network score and video source of the video, use the professional UAV video in the data set as a positive sample, and the amateur UAV video as a negative sample.

The step (2) is specifically implemented as the following actions to:

(2.1) Extract each frame of the UAV video to obtain an image sequence, and perform photometric calibration on each image in the image sequence to eliminate influences from changes in lighting;

(2.2) Use SLAM to calculate the pose of the camera and obtain the UAV's flight trajectory and the orientation of the shooting lens, while the sparse 3D structure of the scene is reconstructed, and both the pose of the camera and the structure of the scene are normalized.

The step (3) is specifically implemented as the following actions to:

(3.1) With the three branches of the multi-modal neural network mainly composed of convolutional neural networks, on the image branch, input the original frames of the video into the convolutional neural network, extract the feature of each frame of image, and then input the extracted features to the Long Short-Term Memory (LSTM) network, to make the discrete single-frame features reconnect according to a time sequence, and use the final output as the video frame image aesthetic features;

(3.2) On the motion branch, use the UAV's flight trajectory and lens orientation obtained in (2.2) as the input of the convolutional neural network, wherein the convolutional layers contain therebetween an activation layer ReLu and a Batch Normalization (BN) layer, and after four convolutional layers, the camera motion features are obtained;

(3.3) On the structure branch, use the sparse 3D structure of the scene obtained in (2.2) as the input of the convolutional neural network to obtain the structure features of the shooting scene.

The step (4) is specifically implemented as the following actions or steps to:

(4.1) Concatenate through a concatenate layer the features obtained from the three branches in step (3), that is, stitch the video frame image aesthetic features, camera motion features and shooting scene structure features together as the aesthetic features of the video;

(4.2) Use the aesthetic features of the video as input of the multi-modal neural network, and then through two fully connected layers, the final output of the multi-modal neural network is a six-dimensional vector, wherein the first two dimensions represent the UAV video aesthetic label, i.e., the video being a professional UAV video or an amateur UAV video, the last four dimensions represent the video scene type, i.e., the video scene type being mountains, rivers, plains or buildings.

Compared with the prior art, the beneficial features of the present disclosure are:

(1) A UAV video aesthetic quality evaluation method based on multi-modal deep learning of the present disclosure, combines deep learning to extract aesthetic features from the UAV video, overcomes the limitation that the current method when manually designing aesthetic features cannot effectively distinguish different contents, and is able to automatically extract the aesthetic features of the video very well.

(2) The method of the present disclosure extracts the aesthetic features of the UAV video from such three branches as image branch, motion branch, and structure branch, combines the characteristics of image video and UAV flight to evaluate the video aesthetic quality, and solves the problem of the UAV video aesthetic quality evaluation criteria being single.

(3) The method of the present disclosure adds scene type classification sub-tasks to promote the learning of aesthetic evaluation tasks, and can obtain higher accuracy and faster convergence speed.

(4) The method of the present disclosure has strong robustness and is not affected by changes in lighting, blurred image, and the like.

DESCRIPTION OF FIGURES

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

Figure 1:
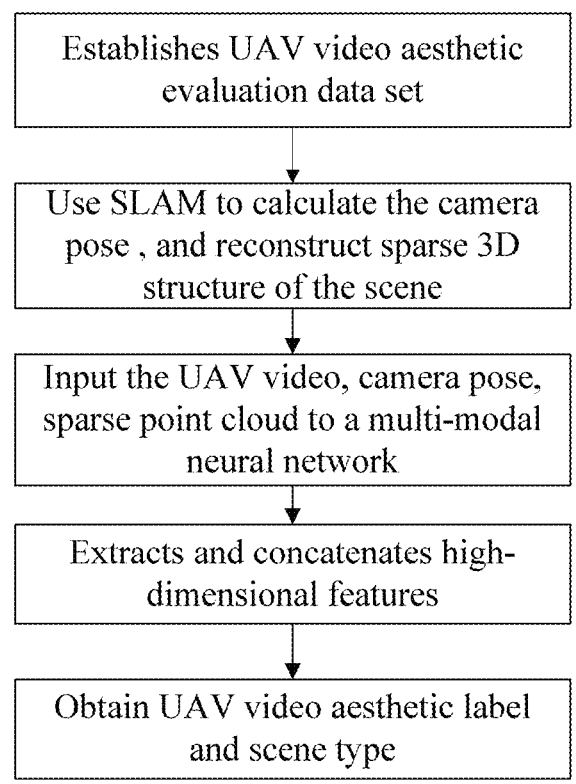
FIG. 1 is a flowchart of the present disclosure.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout. To better understand the technical solution of the present disclosure, the specific mode of carrying out the present disclosure is further described below with reference to the drawings.

FIG. 1 is a flowchart of the present disclosure. The overall objective of the present disclosure is to propose a UAV video aesthetic quality evaluation method based on multi-modal deep learning, which establishes a UAV video aesthetic evaluation data set, analyzes the UAV video through a multi-modal neural network and extracts and concatenates high-dimensional features, thereby achieving evaluation of the UAV video aesthetic quality. The specific steps are to: first establish a data set for UAV video aesthetic evaluation, divide it into positive samples and negative samples according to UAV video shooting quality, and make a classification according to scene shooting content; then use SLAM technology to restore the UAV's flight trajectory, which includes the translation of the UAV and the rotation of the camera, and to reconstruct a sparse 3D structure of the scene; through a multi-modal neural network, extract features of the input UAV video on the image branch, motion branch, and structure branch respectively; and concatenate the features on multiple branches to obtain the final video aesthetic label and video scene type.

Figure 2:
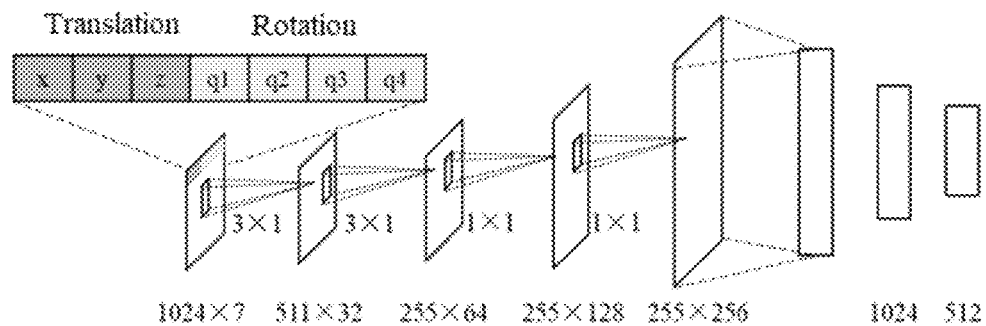
FIG. 2 is a schematic diagram of the structural design of the motion branch deep neural network of the present disclosure.

As shown in FIG. 2, a schematic diagram of the structural design of the motion branch deep neural network of the present disclosure: The UAV is very agile, being able to take images and videos from various angles in the air. Compared with the ordinary video shot on the ground, aerial video has a more obvious change in height, and the camera movement is also different from the common way. Therefore, the multi-modal deep neural network of the present disclosure adds a motion branch to use the characteristics of the motion mode of the UAV video camera to evaluate the aesthetic quality of the video. First SLAM is used to restore the camera pose, and the camera's motion is represented by the translation vectors x, y, z and quaternions $q_1$, $q_2$, $q_3$, $q_4$. Since the onboard camera follows the UAV translation, the translation vectors actually represent the translation of the UAV, and the quaternions represent the rotation of the camera. The length of the vector input to the neural network needs to be fixed, so the trajectory is represented by a vector of 1024×7, that is, the trajectory is composed of 1024 points, and each point is represented by a seven-dimensional vector composed of translation vectors and quaternions. When the number of points is not enough, interpolation supplement is needed. Linear interpolation is used for the translation vector. Since the quaternion represents rotation, a spherical linear interpolation is adopted, the $k^{th}$ point $t_k$ that needs to be interpolated between quaternions $t_{m-1}$ and $t_m$, is expressed as:

$$t_k = \frac{\sin\left[\left(1-\frac{k}{n}\right)\theta\right]}{\sin\theta} t_{m-1} + \frac{\sin\left(\frac{k}{n}\theta\right)}{\sin\theta} t_m$$

wherein, n represents the number of points to be interpolated between any two quaternions $t_{m-1}$ and $t_m$, and $\theta$ is the center angle calculated by $t_{m-1}$ and $t_m$.

The UAV trajectory, after converted into a unified format, is input into the motion branch deep neural network. The motion branch deep neural network extracts the high-dimensional features of the trajectory through four convolutional layers, wherein the first two convolution kernels are 3×1, and the last two convolution kernels are 1×1. Because the points representing the trajectory are related to each other while there is no correlation between the seven-dimensional vectors, the size of the convolution can only be 1, and the number of channels is {32; 64; 128; 256} respectively, the main purpose for which is to increase the dimensionality of each point, thereby improving the characterization ability of features.

Figure 3:
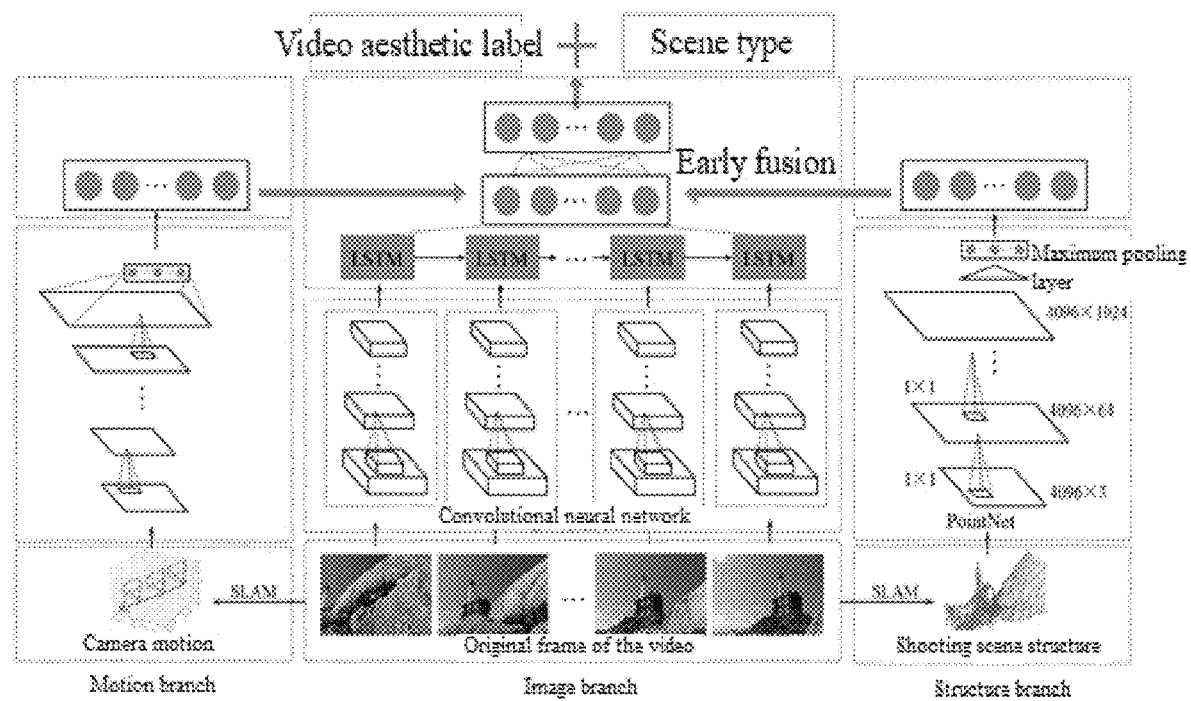
FIG. 3 is a schematic diagram of the overall design of the multi-modal deep neural network structure of the present disclosure.

As shown in FIG. 3, a schematic diagram of the overall design of the multi-modal deep neural network structure of the present disclosure. When the aesthetic quality of the video is considered, the aesthetic quality of the image is usually used for reference. If the aesthetic quality of each frame of the video is low, the aesthetic quality of the video will not be high. Therefore, the method of the present disclosure uses image branch to consider the influence on image aesthetics. The image branch uses the information of the original video frame and uses the residual network of the convolutional neural network to extract the high-dimensional features of the image. However, there is a strong correlation between frames, so the feature of the video sequence is learned through a Long Short-Term Memory (LSTM) network. Because different videos have different lengths, down-sampling should be performed before input to the image branch neural network. The motion branch is based on the original video frame to restore and estimate the flight trajectory of the UAV and the motion of the onboard camera, and then a spherical linear interpolation is performed on a series of discrete points representing the camera's motion, to obtain a fixed-length camera motion trajectory as the input of the motion branch neural network. Then, through the convolutional neural network, the connection between adjacent points is used to obtain the high-dimensional feature of the camera motion.

When the UAV shoots a video, different scene structures also have influences on the final content of the aerial video. Therefore, a structure branch is added to the multi-modal deep neural network of the present disclosure in order to use the structure of the shooting scene to evaluate the UAV video aesthetic quality. First, SLAM is used to reconstruct a sparse point cloud of the scene according to the original video frame, and obtain the 3D structure of the scene. Then, through point cloud filtering, the point cloud is down-sampled to 4096 points with each point represented by a 3D vector (x, y, z), and input into a structure branch neural network. The point cloud classification neural network PointNet is used to extract high-dimensional features. After multi-modal high-dimensional features are extracted, the three branches are concatenated.

When the features of multiple branches are concatenated, the Early Fusion method is adopted, which mainly lies in, with a concatenate layer in the front, extracting and concatenating features at a fully connected layer among the branches. At the time, each branch is equivalent to a feature extractor, and the concatenated features pass through two more fully connected layers to obtain the final aesthetic label and scene type. The optimal fusion weight can be learned through a classifier:

$$W = \underset{w,b}{\mathrm{argmin}} - \frac{1}{N}\sum_{i=1}^{N}\{y_i \ln[\sigma(z)] + (1-y_i)\ln[1-\sigma(z)]\}$$

wherein, y represents the real label, σ(z) represents the actual output, N is the number of samples, and w and b are the parameters of the neural network.

After passing through the concatenate layer, the following actions are performed: use multi-task learning, add scene type classification tasks to promote the UAV video aesthetic quality evaluation task learning, and finally obtain the UAV video aesthetic label and scene type. Table 1 is a comparison of the accuracy rates (%) of the aesthetic classification and scene type classification on the UAV video aesthetic quality data set. It can be seen from Table 1 that the accuracy rate of the present disclosure's method combined with multi-branches is higher than that of any single branch.

TABLE 1

Comparison of accuracy rates (%) of aesthetic classification and scene type classification

| Method | Aesthetic Classification | Scene Type |
|---|---|---|
| Image Branch | 78.74 | 75.13 |
| Motion Branch | 78.02 | 37.89 |
| Structure Branch | 67.52 | 35.58 |
| Multi-branch Early Fusion | 89.12 | 78.62 |

Figure 4:
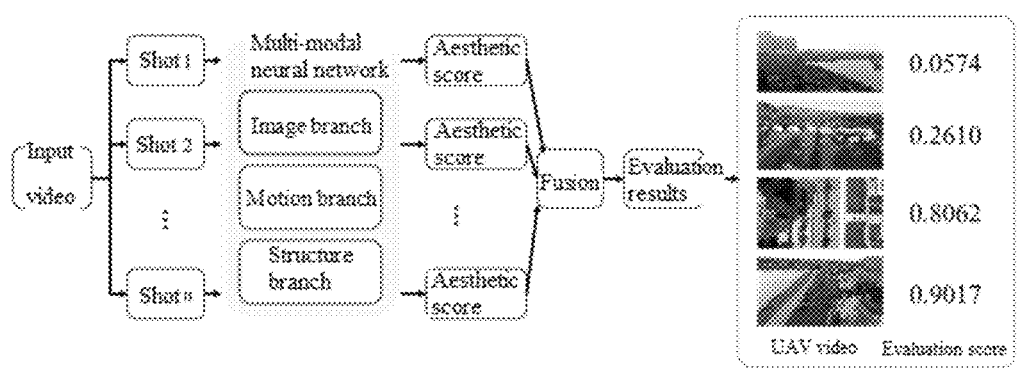
FIG. 4 is an application sample diagram of UAV video aesthetic quality evaluation based on multi-modal deep learning of the present disclosure.

FIG. 4 is an application sample diagram of UAV video aesthetic quality evaluation based on multi-modal deep learning of the present disclosure. For a UAV video, firstly the UAV video is segmented into individual shots in units of shots, and each shot is input into a multi-modal neural network. The probability of the finally obtained aesthetic label is used as the aesthetic score, and then the score is concatenated to finally obtain the evaluation score a of the entire UAV video:

$$a = \frac{a_1 m_1 + a_2 m_2 + \ldots + a_n m_n}{m_1 + m_2 + \ldots + m_n}$$

wherein, $a_n$ represents the aesthetic score of shot n, and $m_n$ represents the number of frames. It can be seen from the figure that the method of the present disclosure can score the aesthetic quality of UAV videos on the Internet.

Figure 5:
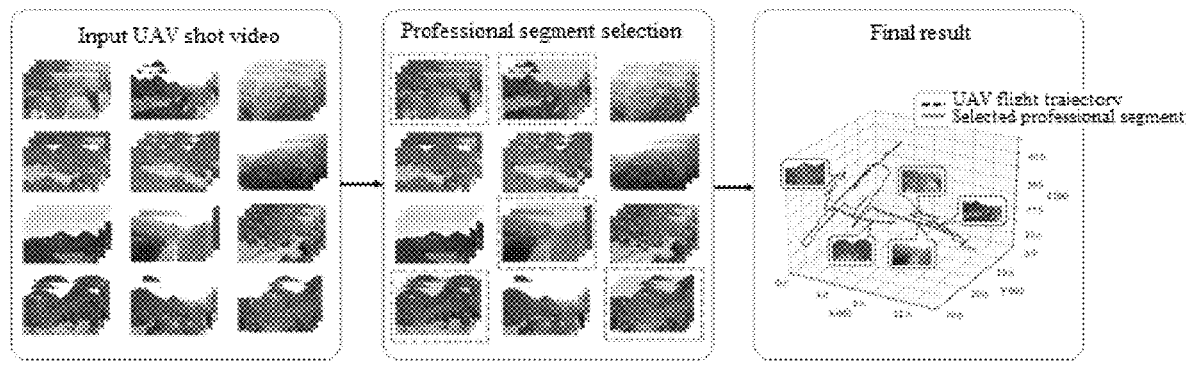
FIG. 5 is an application example diagram of UAV video professional segment detection of the present disclosure.

FIG. 5 is an application example diagram of UAV video professional segment detection of the present disclosure. Ordinary users lack the relevant professional knowledge and experience, so the quality of the UAV video they shot is not ideal. The method of the present disclosure shown in the figure detects the segments of high aesthetic quality in a long UAV video as professional segments, being able to implement intelligent automatic editing of the UAV video. First, a long video is cut into several segments $s_1, s_2 \ldots s_n$, and the camera motion and scene structure can also be obtained through SLAM. Then the segments with the highest aesthetic scores in individual segments are selected:

$$s = \underset{s_1,\ldots,s_n}{\mathrm{argmax}}\{h(s_1, c_1, p_1), \ldots, h(s_n, c_n, p_n)\}$$

wherein, h represents the prediction result of the aesthetic quality of the video by the multi-modal deep neural network, s is the video segment, c is the camera motion, and p is the scene structure.

The above are only some basic descriptions of the present disclosure, and any equivalent transformations made according to the technical solutions of the present disclosure shall fall within the protection scope of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An Unmanned Aerial Vehicle (UAV) video aesthetic quality evaluation method based on multi-modal deep learning, comprising:

(1) counting sources, shooting locations, shooting methods, and scene types of UAV videos, to establish a UAV video aesthetic evaluation data set, and dividing the data set into positive samples and negative samples according to network scores and shooting quality; wherein positive samples are professional UAV videos from aerial documentaries or movie clips shot by professionals with a network score higher than 8.0 (out of 10.0), while negative samples are amateur UAV videos from videos taken by amateurs using consumer-grade UAVs;

(2) for a UAV video in the UAV video aesthetic evaluation data set, using a Simultaneous Localization And Mapping (SLAM) technology, based on a correlation between frames in the UAV video, to restore a pose of camera, that is, UAV's flight trajectory and orientation of shooting lens, and to reconstruct a sparse 3D structure of scene, wherein both the pose of the camera and the structure of the scene are normalized;

(3) inputting the UAV video into a multi-modal neural network, a structure of the multi-modal neural network divided into three branches: image branch, motion branch and structure branch; wherein input of the image branch is original frames of the video, while inputs of the motion branch and the structure branch are respectively the UAV's flight trajectory and the orientation of the shooting lens as well as the sparse 3D structure of the scene; and wherein video frame image aesthetic features, camera motion features, and shooting scene structure features are respectively extracted on three branches through the multi-modal deep learning; and (4) concatenating the extracted video frame image aesthetic features, camera motion features, and shooting scene structure features as aesthetic features of the video; and by adding a classification sub-task of a scene type of the video, classifying the scene type of the video as mountains, rivers, plains or buildings, to improve generalization ability and learning effect of multi-modal neural network model, and to finally obtain a UAV video aesthetic label as a result of the UAV video aesthetic quality evaluation, that is, the video is a professional UAV video or is an amateur UAV video.

2. The UAV video aesthetic quality evaluation method based on multi-modal deep learning according to claim 1, wherein the counting and dividing are implemented as:
- (2.1) establishing one UAV video aesthetic evaluation data set, each segment of video in the data set is a complete segment of shot without irrelevant noises of watermarks, logos, and borders;
- (2.2) counting whether each segment of video comes from a video website or a documentary, where the video was taken, and how the UAV video was filmed, that is, rotation shooting, forward shooting, side flight shooting or backward shooting, as well as whether the scene type of the video is mountains, rivers, plains or buildings; and
- (2.3) based on the shooting quality, network score and video source of the video, using the professional UAV video in the data set as the positive samples, and the amateur UAV video as the negative samples.

3. The UAV video aesthetic quality evaluation method based on multi-modal deep learning according to claim 1, wherein the using the Simultaneous Localization And Mapping (SLAM) technology is implemented as:
- (3.1) extracting each frame of the UAV video to obtain an image sequence, and performing photometric calibration on each image in the image sequence to eliminate influences from changes in lighting; and
- (3.2) using SLAM to calculate the pose of the camera and obtain the UAV's flight trajectory and the orientation of the shooting lens, while the sparse 3D structure of the scene is reconstructed, and both the pose of the camera and the structure of the scene are normalized.

4. The UAV video aesthetic quality evaluation method based on multi-modal deep learning according to claim 1, wherein the inputting the UAV video is implemented as:
- (4.1) with the three branches of the multi-modal neural network mainly composed of convolutional neural network, on the image branch, inputting the original frames of the video into the convolutional neural network, extracting features of each frame of image, and then inputting the extracted features to a Long Short-Term Memory (LSTM) network, to make discrete single-frame features reconnect according to a time sequence, and use final output as the video frame image aesthetic features;
- (4.2) on the motion branch, using the UAV's flight trajectory and lens orientation obtained in (3.2) as input of the convolutional neural network, wherein convolutional layers contain therebetween an activation layer ReLu and a Batch Normalization (BN) layer, and after four convolutional layers, the camera motion features are obtained; and
- (4.3) on the structure branch, using the sparse 3D structure of the scene obtained in (3.2) as input of the convolutional neural network to obtain the structure features of the shooting scene.

5. The UAV video aesthetic quality evaluation method based on multi-modal deep learning according to claim 1, wherein the concatenating and classifying are implemented as:
- (5.1) concatenating through a concatenate layer the features obtained from the three branches, that is, stitching the video frame image aesthetic features, camera motion features and shooting scene structure features together as the aesthetic features of the video; and
- (5.2) using the aesthetic features of the video as input of the multi-modal neural network, and then through two fully connected layers, the multi-modal neural network finally outputting a six-dimensional vector, wherein first two dimensions represent the UAV video aesthetic label, i.e., the video being the professional UAV video or the amateur UAV video, and last four dimensions represent the scene type of the video, i.e., the scene type of the video being mountains, rivers, plains or buildings.

* * * * *